(12) United States Patent
Long et al.

(10) Patent No.: US 11,252,860 B2
(45) Date of Patent: Feb. 22, 2022

(54) AGRICULTURAL PRODUCT CONTROL SYSTEM FOR AN AGRICULTURAL IMPLEMENT

(71) Applicant: CNH Industrial America LLC, New Holland, PA (US)

(72) Inventors: David Long, Washington, IL (US); John C. Endsley, Washington, IL (US); Paul A. Hurtis, Mackinaw, IL (US)

(73) Assignee: CNH Industrial America LLC, New Holland, PA (US)

( * ) Notice: Subject to any disclaimer, the term of this patent is extended or adjusted under 35 U.S.C. 154(b) by 579 days.

(21) Appl. No.: 16/189,835

(22) Filed: Nov. 13, 2018

(65) Prior Publication Data

US 2020/0146207 A1 May 14, 2020

(51) Int. Cl.
  *A01C 7/20* (2006.01)
  *A01C 5/06* (2006.01)
  *A01B 63/111* (2006.01)
  *A01B 79/00* (2006.01)

(52) U.S. Cl.
  CPC ............ *A01C 7/203* (2013.01); *A01B 63/111* (2013.01); *A01B 79/005* (2013.01); *A01C 5/068* (2013.01)

(58) Field of Classification Search
  CPC ......... A01C 7/203; A01C 7/205; A01C 5/068; A01B 63/111; A01B 79/005
  See application file for complete search history.

(56) References Cited

U.S. PATENT DOCUMENTS

| 5,624,635 A | 4/1997 | Pryor |
| 5,911,362 A | 6/1999 | Wood et al. |
| 6,269,757 B1 | 8/2001 | Kiest |

(Continued)

FOREIGN PATENT DOCUMENTS

| CN | 201947650 U | 8/2011 |
| CN | 103134551 A | 6/2013 |

(Continued)

OTHER PUBLICATIONS

Hensen, Arjan et al.; "Low cost and state of the art methods to measure nitrous oxide emissions"; IPO Publishing, Environmental Research Letters 8; Jun. 27, 2013 (10 pages).

(Continued)

*Primary Examiner* — Jamie L McGowan
(74) *Attorney, Agent, or Firm* — Rebecca L. Henkel; Rickard K. DeMille (57) ABSTRACT

An agricultural product control system for an agricultural implement includes an actuator configured to control a penetration depth of an agricultural product application system within soil, a sensor positioned above a surface of the soil and configured to output a sensor signal indicative of agricultural product above the surface of the soil, and a controller including a memory and a processor. The controller is configured to receive the sensor signal indicative of the agricultural product above the surface of the soil, and output a control signal to the actuator indicative of instructions to adjust the penetration depth of the agricultural product application system based on the sensor signal indicative of the agricultural product above the surface of the soil.

20 Claims, 6 Drawing Sheets

(56) References Cited

U.S. PATENT DOCUMENTS

| | | | |
|---|---|---|---|
| 6,510,367 B1* | 1/2003 | McQuinn | A01B 79/005 700/241 |
| 6,907,336 B2* | 6/2005 | Gray | A01B 69/008 701/50 |
| 7,010,425 B2* | 3/2006 | Gray | A01B 69/008 172/2 |
| 7,036,441 B2 | 5/2006 | Scudder | |
| 7,096,802 B1 | 8/2006 | Kiest | |
| 7,162,834 B2 | 1/2007 | Layzell et al. | |
| 7,689,394 B2* | 3/2010 | Furem | E02F 9/267 703/8 |
| 7,870,827 B2 | 1/2011 | Bassett | |
| 7,908,062 B2* | 3/2011 | Corcoran | E02D 1/027 701/50 |
| 8,327,780 B2 | 12/2012 | Bassett | |
| 8,504,252 B2 | 8/2013 | Hamilton et al. | |
| 8,688,600 B2 | 4/2014 | Barton et al. | |
| 9,532,499 B2 | 1/2017 | Anderson et al. | |
| 9,592,801 B2 | 3/2017 | Ardison et al. | |
| 2010/0115833 A1 | 5/2010 | Arbogast | |
| 2010/0180808 A1* | 7/2010 | Liu | A01C 7/205 111/130 |
| 2011/0231069 A1* | 9/2011 | Ryder | A01C 7/203 701/50 |
| 2014/0116735 A1* | 5/2014 | Bassett | A01B 63/008 172/2 |
| 2014/0172247 A1* | 6/2014 | Thomson | A01B 63/112 701/50 |
| 2014/0303854 A1* | 10/2014 | Zielke | G01K 1/14 701/50 |
| 2016/0165789 A1* | 6/2016 | Gervais | A01C 7/205 700/275 |
| 2016/0345489 A1 | 12/2016 | Litterly et al. | |
| 2018/0139895 A1 | 5/2018 | Brechon | |
| 2018/0199499 A1 | 7/2018 | Adams et al. | |
| 2019/0075710 A1* | 3/2019 | Strnad | A01C 5/066 |
| 2019/0380259 A1* | 12/2019 | Frank | A01C 5/068 |

FOREIGN PATENT DOCUMENTS

| | | |
|---|---|---|
| CN | 102754549 B | 1/2014 |
| JP | H11313594 A | 11/1999 |
| JP | 2011177051 A | 9/2011 |
| SU | 1676492 A1 | 9/1991 |
| WO | WO-2017197274 A1 * | 11/2017 ............ A01C 7/205 |

OTHER PUBLICATIONS

Arogo, J. et al.; "Ammonia Emissions from Animal Feeding Operations"; White Paper for National Center for Manure and Animal Waste Management; 2009 (66 pages).

Yang, Z.P. et al.; "Loss of nitrogen by ammonia volatilisation and denitrification after application of urea to maize in Shanxi Province, China"; CSIRO Publishing (www.publish.csiro.au/journals/sr), Soil Reseach, 2011, 49 pp. 462-469 (8 pages).

Ag Professional; "Myths and truths about NH3 fertilizer," Farm Journal, May 10, 2011 (3 pages).

* cited by examiner

AGRICULTURAL PRODUCT CONTROL SYSTEM FOR AN AGRICULTURAL IMPLEMENT

BACKGROUND

The present disclosure relates generally to an agricultural product control system for an agricultural implement.

Generally, agricultural implements are towed behind a work vehicle, such as a tractor. Such implements may contain a volatile agricultural product, such as fertilizer, and/or other agricultural product, which is distributed on or in the ground using various methods. For example, certain implements form a trench in the ground, deposit the volatile agricultural product in the trench, and then close the trench over the volatile agricultural product. Proper closure of the trench may enhance application of the volatile agricultural product and crop production. In some instances, the trench may not properly close due to soil conditions, rocks, residue buildup, and other impediments. If the trench is not properly closed, the volatile agricultural product may escape the trench after application. Greater amounts of the volatile agricultural product may be applied to compensate for the escaped volatile agricultural product, thereby increasing the cost of applying the volatile agricultural product.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an agricultural product control system for an agricultural implement includes an actuator configured to control a penetration depth of an agricultural product application system within soil, a sensor positioned above a surface of the soil and configured to output a sensor signal indicative of the agricultural product above the surface of the soil, and a controller including a memory and a processor. The controller is configured to receive the sensor signal indicative of the agricultural product above the surface of the soil, and output a control signal to the actuator indicative of instructions to adjust the penetration depth of the agricultural product application system based on the sensor signal indicative of the agricultural product above the surface of the soil.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to improving agricultural product application from an agricultural implement (e.g., planter, seeder, fertilizer applicator, etc.). The agricultural product may include a fertilizer (e.g., anhydrous ammonia). The present disclosure relates to a row unit of the agricultural product control system that forms a trench in soil, applies the agricultural product within the trench, and at least partially closes the trench. Certain agricultural products (e.g., certain fertilizers) are volatile such that they are easily evaporated at normal temperatures. As such, volatile agricultural products that are applied to the trench may escape the trench prior to and/or after closure of the trench. The agricultural product control system detects the volatile agricultural product generally above the soil surface after the volatile agricultural product is applied within the soil. For example, the agricultural product control system may include a sensor positioned behind a closing system of the row unit that detects the volatile agricultural product generally above the soil surface (e.g., escaping from the trench). In response to detecting the volatile agricultural product, the agricultural product control system may perform certain control operations to at least partially block the volatile agricultural product from escaping from the trench or to lessen an amount of the volatile agricultural product escaping from the trench (e.g., to cause the soil to retain more of the volatile agricultural product). Such control operations may include adjusting a depth at which the volatile agricultural product is applied within the soil, adjusting a pressure applied by the closing system of the row unit, adjusting an angle of a closing disc of the closing system, and other adjustments of the row unit. The ability of the soil to retain more of the volatile agricultural product may improve crop yields, decrease costs associated with application of the volatile agricultural product (e.g., use less volatile agricultural product), improve environmental conditions, and other operating parameters.

Figure 1:
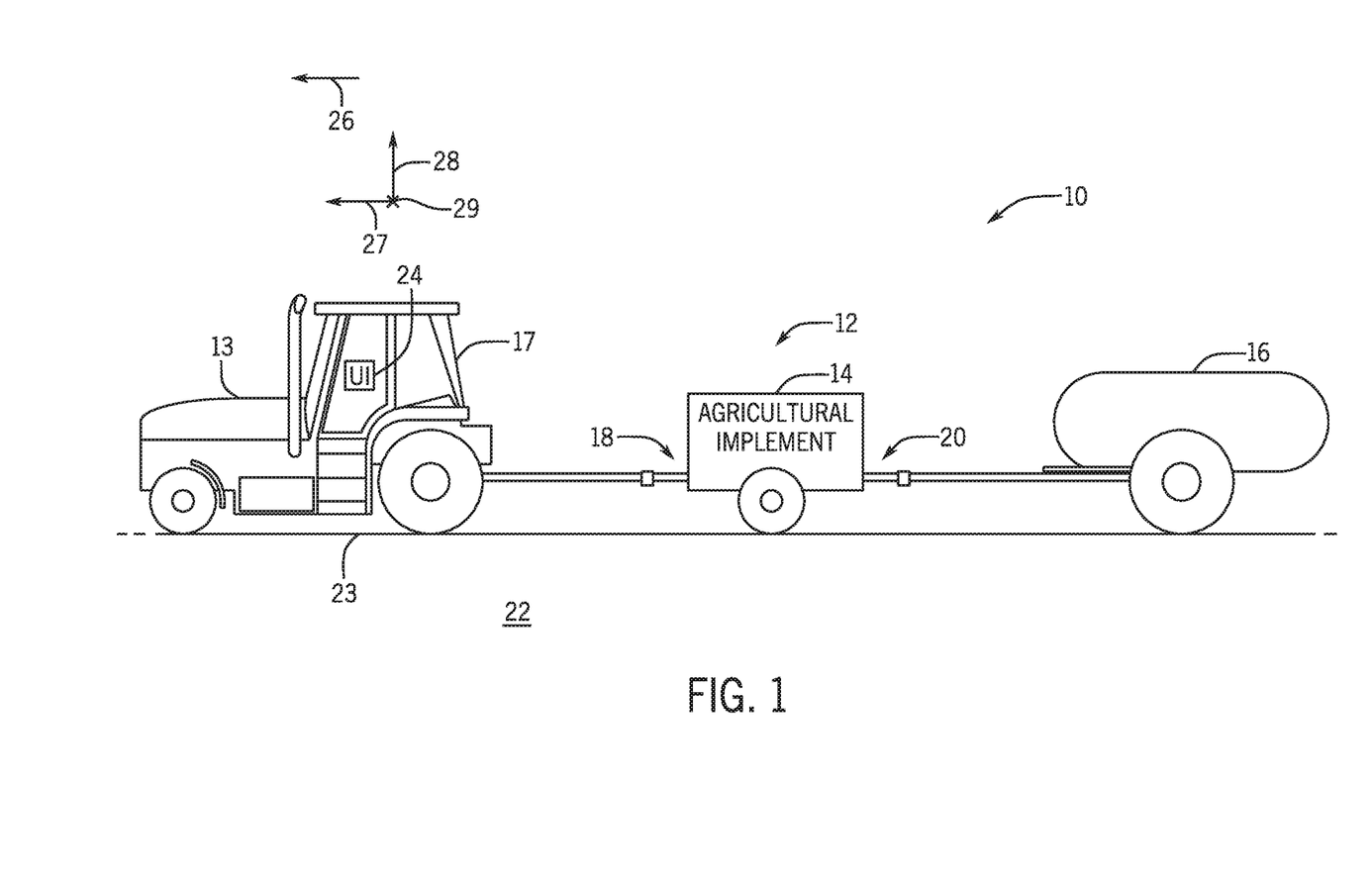
FIG. 1 is a side view of an embodiment of an agricultural system having an agricultural implement and an agricultural product control system, in accordance with an aspect of the present disclosure.

With the foregoing in mind, the present embodiments relating to agricultural product control systems may be utilized within any suitable agricultural system. For example, FIG. 1 is a side view of an embodiment of an agricultural system 10 having an agricultural product control system 12. The agricultural system 10 includes a work vehicle 13, an agricultural implement 14, and a tank assembly 16. The work vehicle 13 may be any vehicle suitable for towing the agricultural implement 14, such as a tractor, off-road vehicle, and so forth. Additionally, the agricultural implement 14 may be any implement suitable for applying volatile agricultural product (e.g., agricultural product) to a field, such as a tillage implement, a fertilizer implement, or another agricultural implement. The tank assembly 16 may carry the volatile agricultural product (e.g., fertilizer, fungicide, insecticide, root stimulator, etc.) that is applied by the agricultural implement 14. In some instances, the volatile agricultural product may easily evaporate at ambient temperatures. Further, although the tank assembly 16 is illustrated, in other embodiments, any suitable auxiliary implement configured to carry the volatile agricultural product may be towed behind the agricultural implement 14. Additionally, in certain embodiments, the tank assembly 16 may be disposed between the work vehicle 13 and the agricultural implement 14, or the agricultural system 10 may include a tank assembly as part of an agricultural implement in place of or in addition to the tank assembly 16. As illustrated, the work vehicle 13 includes a cab 17 that may house a user (e.g., an operator of the work vehicle 13). In certain embodiments, the cab 17 may be omitted. Further, in some embodiments, the agricultural system 10 may be autonomously and/or remotely controlled, such that the user is not positioned at the work vehicle 13.

The work vehicle 13 is coupled to the agricultural implement 14 by a front hitch assembly 18. As illustrated, the agricultural implement 14 is coupled to the tank assembly 16 by a rear hitch assembly 20. The agricultural system 10 travels over soil 22, such as the ground, a field, or another surface. As the agricultural system 10 travels over the soil 22, the agricultural implement 14 may deposit the volatile agricultural product within the soil 22. For example, the volatile agricultural product may flow from the tank assembly 16, through the agricultural implement 14, and into the soil 22. The agricultural implement 14 may include row units that form trenches in the soil 22, apply the volatile agricultural product within the trenches, and at least partially close the trenches.

Certain row units of the agricultural implement 14 may include sensors that detect a presence and/or an amount of the volatile agricultural product generally above a surface 23 of the soil 22. Based on the detected volatile agricultural product generally above the soil, the agricultural product control system 12 performs certain control operations at the row units to at least partially block the volatile agricultural product from escaping from the soil or to lessen an amount of the volatile agricultural product escaping from the soil. For example, the agricultural product control system 12 may compare the amount of the volatile agricultural product generally above the soil surface 23 to a threshold value. If the amount is greater than the threshold value, the agricultural product control system 12 may perform certain control operations at the row unit(s). The threshold value may be a percentage of an amount of the volatile agricultural product output to the soil 22. For example, the threshold value may be an amount per linear distance (e.g., 10 kilograms/100 meters) and/or an amount per time (e.g., 20 kilograms/hour). Further, the threshold value may depend on certain factors, such as the type of volatile agricultural product, properties of the soil 22, user preferences, a rate of application of the volatile agricultural product, and other factors that may affect the application of the volatile agricultural product. Moreover, as described in greater detail below, the agricultural product control system 12 may distinguish between momentary detection of the volatile agricultural product generally above the soil surface 23 (e.g., momentary escapes of the volatile agricultural product from the soil 22) and extended detection (e.g., three to five seconds) of the volatile agricultural product generally above the soil surface 23 (e.g., extended escapes of the volatile agricultural product from the soil 22).

In certain embodiments, the agricultural product control system 12 may compare the amount of the volatile agricultural product generally above the soil surface 23 to multiple threshold values and may notify the user of the amount exceeding the multiple threshold values and/or may perform the certain control operations. For example, if the amount of the volatile agricultural product generally above the soil surface 23 exceeds both a first threshold value and a second threshold value that is higher than the first threshold value, the agricultural product control system 12 may cause the agricultural system 10 to stop operating. In such an embodiment, the agricultural product control system 12 may determine that the amount of the volatile agricultural product generally above the soil surface 23 is too high to continue operation of the agricultural system 10 without performing other control operations and/or without user involvement.

As illustrated, the agricultural product control system 12 includes a user interface 24 positioned within the cab 17. In certain embodiments, the user interface 24 may be disposed remotely from the agricultural system 10 to enable the user positioned remotely from the agricultural system 10 to view and/or interact with the user interface 24. The user interface 24 may provide certain control options to a user of the agricultural system 10, display control operations performed by the agricultural product control system 12, display detected values related to operation of the agricultural product control system 12 (e.g., indicators indicative of the detected volatile agricultural product generally above the soil surface 23), or a combination thereof. As described in greater detail below, the user interface 24 may be communicatively coupled to a controller of the agricultural product control system 12 that performs the control operations at the row units of the agricultural implement 14. For purposes of discussion, reference may be made to a longitudinal axis or direction 27 parallel to a direction of travel 26 of the agricultural implement 14, a vertical axis or direction 28, and a lateral axis or direction 29 perpendicular to the direction of travel 26 of the agricultural implement 14.

Figure 2:
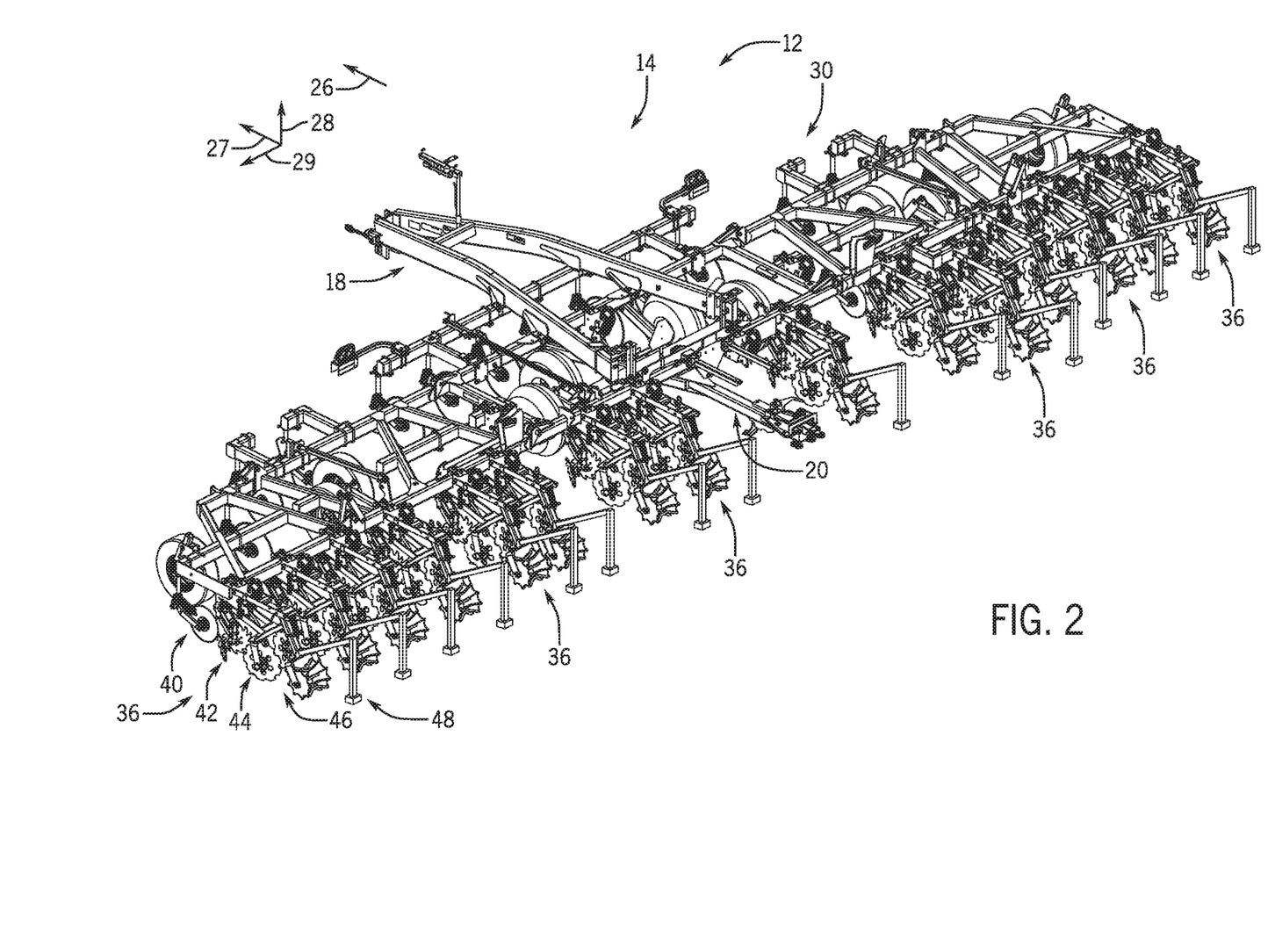
FIG. 2 is a perspective view of an embodiment of the agricultural implement of FIG. 1, in accordance with an aspect of the present disclosure.

FIG. 2 is a perspective view of an embodiment of the agricultural implement 14 of FIG. 1. In the illustrated embodiment, the agricultural implement 14 includes the front hitch assembly 18, the rear hitch assembly 20, a frame assembly 30, and shank row units 36. The front hitch assembly 18 is coupled to the frame assembly 30 (e.g., by one or more brackets, braces, bolts, welded connections, or another suitable connection(s)) and may be coupled to the work vehicle of the agricultural system. For example, the work vehicle may tow the agricultural implement 14 via the front hitch assembly 18. The rear hitch assembly 20 is also coupled to the frame assembly 30 and may be coupled to the tank assembly. For example, the agricultural implement 14 may tow the tank assembly via the rear hitch assembly 18.

As the agricultural implement 14 is towed along the soil, the shank row units 36 may form trenches within the soil, apply the volatile agricultural product within the trenches, and at least partially close the trenches. As illustrated, each shank row unit 36 includes a coulter assembly 40, a residue management system 42, an agricultural product application system 44, a closing system 46, and a sensor assembly 48. The coulter assembly 40 is configured to prepare the soil for application of the volatile agricultural product. For example, the coulter assembly 40 may include a coulter disc that rolls along and penetrates the surface of the soil to break up the soil and/or to begin forming the trench within the soil.

As the agricultural implement 14 travels across the soil, the residue management system 42 interacts with the ground in a manner that enables the agricultural product application system 44 to form the trench within the soil and/or to apply the volatile agricultural product to the soil. For example, the residue management system 42 may include residue discs that break apart clods of the soil, move debris out of a pathway of the agricultural product application system 44, level out the soil, penetrate the soil, or a combination thereof.

The agricultural product application system 44 forms the trench within the soil and applies the volatile agricultural product (e.g., the fertilizer or other volatile agricultural product) within the trench. As described in greater detail below, the agricultural product application system 44 may include a shank assembly, a knife, or other suitable tools for engaging the soil and forming the trench. As the agricultural product application system 44 forms the trench, an applicator of the agricultural product application system 44 may deliver the volatile agricultural product to/within the trench.

The closing system 46 of each shank row unit 36 is configured to at least partially close the trench in the soil formed by the coulter assembly 40, the residue management system 42, the agricultural product application system 44, or a combination thereof. After application of the volatile agricultural product by the agricultural product application system 44, closure of the trench by the closing system 46 may enhance absorption of the volatile agricultural product by the soil. For example, the closure may trap the volatile agricultural product within the soil, thereby enabling the soil to absorb more of the volatile agricultural product.

The sensor assembly 48 is configured to detect volatile agricultural product generally above the soil surface. For example, after application of the volatile agricultural product by the agricultural product application system 44 and closure of the trench by the closing system 46, some of the volatile agricultural product may be present above the soil surface (e.g., a portion of the volatile agricultural product may escape the trench and flow vertically outward and away from the soil surface). In certain embodiments, the sensor assembly 48 is configured to detect a presence and/or an amount of the volatile agricultural product generally above the soil surface.

Based on the volatile agricultural product (e.g., amount of volatile agricultural product) detected above the soil surface by the sensor assembly 48, the agricultural product control system 12 may perform certain control operations at the row unit(s) 36. For example, the agricultural product control system 12 may control the agricultural product application system 44 to adjust a depth at which the volatile agricultural product is applied within the soil. The agricultural product control system 12 may control the depth of the agricultural product application system 44 by adjusting a position of the agricultural product application system 44 and/or a down pressure applied by the agricultural product application system 44. Additionally or alternatively, the agricultural product control system 12 may control the closing system 46 to adjust a pressure that the closing system 46 applies to the soil. As such, the agricultural product control system 12 may adjust each shank row unit 36, or portion(s) thereof, to enhance application and/or absorption of the volatile agricultural product within the soil. As described in greater detail below, the agricultural product control system 12 may also notify the user of the volatile agricultural product detected above the soil surface by the sensor assembly 48.

In certain embodiments, the agricultural product control system 12 may control the shank row units 36 individually, in sections, or as a single group. For example, if each shank row unit 36 includes the sensing assembly 48, the agricultural product control system 12 may control the depth at which the volatile agricultural product is applied and/or the positions/down pressure of the other row unit components (e.g., the closing system) individually at each row unit. In some embodiments, the shank row units 36 may be grouped into sections, and each or only some of the shank row units 36 in each section may include the sensing assembly 48. The agricultural product control system 12 may control the section of shank row units 36 as a group (e.g., may set the depths at which the volatile agricultural product is applied from shank row units 36 of the group as the same depths) based on detected value(s) from a single sensing assembly 48 or from multiple sensing assemblies 48 of the section. Still further, all of the shank row units 36 of the agricultural implement 14 may be controlled as a single group, such that the depth of the agricultural product application system and/or the position/down pressure of the closing system is adjusted similarly at each shank row unit 36.

Figure 3:
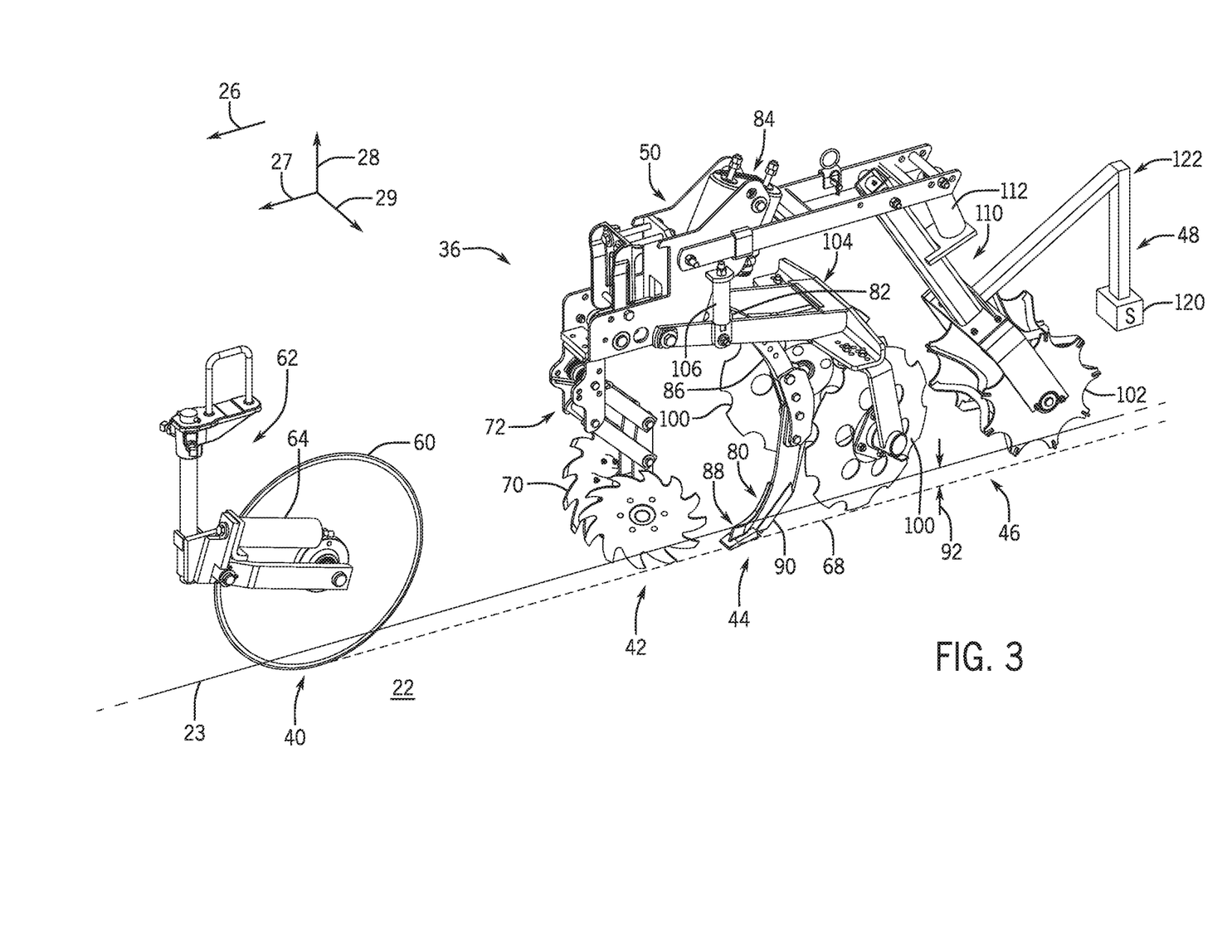
FIG. 3 is a perspective view of an embodiment of a shank row unit of the agricultural implement of FIG. 2, in accordance with an aspect of the present disclosure.

FIG. 3 is a perspective view of an embodiment of the shank row unit 36 of the agricultural implement of FIG. 2. The shank row unit 36 includes the coulter assembly 40, the residue management system 42, the agricultural product application system 44, the closing system 46, and the sensor assembly 48. Each of the residue management system 42, the agricultural product application system 44, the closing system 46, and the sensor assembly 48 are coupled to a row unit frame 50. The row unit frame 50 may be coupled to the frame assembly of the agricultural implement. The coulter assembly 40 may be coupled to the frame assembly and/or to the row unit frame.

As illustrated, the coulter assembly 40 includes a coulter disc 60, a linkage assembly 62, and an actuator 64. The coulter disc 60 is configured to prepare the soil 22 for application of the volatile agricultural product. For example, the coulter disc 60 is configured to roll along and penetrate the soil 22, to cut residue on the soil 22, and/or to begin forming a trench 68 within the soil 22. The linkage assembly 62 is coupled to the coulter disc 60 and may be coupled to the frame assembly of the agricultural implement. The actuator 64 is coupled to portions of the linkage assembly 62 and is configured to adjust a vertical position and/or a down pressure of the coulter disc 60. For example, portion(s) of the linkage assembly 62 may pivot relative to one another and/or relative to the frame assembly, and the coulter disc 60 may move generally vertically along the vertical axis 28 as the portion(s) of the linkage assembly 62 pivot.

As illustrated, the residue management system 42 includes residue discs 70 and a linkage assembly 72. The residue discs 70 are configured to interact with the ground in a manner that enables the agricultural product application system 44 to better form the trench 68 within the soil 22 and/or to apply the volatile agricultural product to the soil 22. For example, the residue discs 70 may break apart clods of the soil 22, move debris out of a pathway of the agricultural product application system 44, level out the soil 22, penetrate the soil 22, or a combination thereof. The residue discs 70 are coupled to the row unit frame 50 via the linkage assembly 72. Portion(s) of the linkage assembly 72 are configured to pivot relative to one another and relative to the row unit frame 50 to enable the residue discs 70 to move generally vertically along the vertical axis 28. In certain embodiments, the residue management system may include an actuator configured to adjust a position and/or a down pressure of the residue discs. For example, the agricultural product control system may control the position and/or the down pressure of the residue discs via the actuator.

As illustrated, the agricultural product application system 44 includes a shank assembly 80, a linkage assembly 82, and an actuator 84. The shank assembly 80 is coupled to the linkage assembly 82, and the linkage assembly 82 is coupled to the row unit frame 50 and to the actuator 84. The actuator 84 is also coupled to the row unit frame 50. The shank assembly 80 is configured to pivot relative to the row unit frame 50 via the linkage assembly 82. For example, as the shank row unit 36 travels across the soil 22, the shank assembly 80 may pivot via the linkage assembly 82. The actuator 84 controls a position and/or a down pressure of the shank assembly 80. In certain embodiments, the actuator 84 may adjust a force applied by a spring that biases the shank assembly 80 toward the soil 22. In certain embodiments, the actuator 84 may include a spring, a hydraulic cylinder, a pneumatic cylinder, or other suitable biasing component configured to apply the pressure and/or adjust a depth of the shank assembly 80.

The shank assembly 80 includes an arm 86, a knife assembly 88, and an applicator 90. The arm 86 is coupled to the linkage assembly 82 and to the knife assembly 88. As the row unit moves along the soil 22, the knife assembly 88 is forms the trench 68. The applicator 90 is disposed along the arm 86 adjacent to the knife assembly 88 and is configured to deliver the volatile agricultural product to the trench 68 for application to the soil 22. As illustrated, the shank assembly 80 is disposed at a depth 92 within the soil 22. The depth 92 is adjustable by the actuator 84 and may vary based on certain factors (e.g., soil properties, the type of agricultural product, and other factors). For example, the depth may be six to eight inches, four to eight inches, six to ten inches, four to ten inches, or other suitable depths. Additionally, as described in greater detail below, the depth 92 may be adjustable based on detected agricultural product generally above the soil surface 23 as determined by the sensing assembly 48.

As illustrated, the closing system 46 includes closing discs 100 and a closing device 102. The closing system 46 also includes a linkage assembly 104 and an actuator 106. The closing discs 100 are coupled to the row unit frame 50 via the linkage assembly 104, and the linkage assembly 104 is configured to pivot relative to the row unit frame 50. The actuator 106 is coupled to the linkage assembly 104 and to the row unit frame 50 and is configured to adjust a vertical position and/or a down pressure of the closing discs 100 relative to the soil 22. As the shank row unit 36 moves along the soil 22, the closing discs 100 at least partially close the trench 68 to enhance application of the volatile agricultural product to the soil 22. In certain embodiments, the shank row unit 36 may include an actuator that controls an angle of the closing discs 100 relative to the trench 68 and/or the soil surface 23. For example, the controller of the agricultural product control system may control the actuator to adjust the angle of the closing discs 100 relative to the trench 68 and/or the soil surface 23.

The closing system 46 also includes a linkage assembly 110 and an actuator 112. The closing device 102 is coupled to the row unit frame 50 via the linkage assembly 110. The actuator 112 is coupled to portions of the linkage assembly 104 and is configured to adjust a position of the closing device 102 relative to the soil 22 and/or a down pressure of the closing device. As the shank row unit 36 moves along the soil 22, the closing device 102 at least partially closes and/or packs soil onto the trench 68 to enhance application of the volatile agricultural product to the soil 22. The closing device 102 is generally hollow and includes ribbed edges configured to move the soil 22 to at least partially close the trench 68. In certain embodiments, the closing device 102 may be a solid wheel configured to compact and/or move the soil 22. In certain embodiments, the actuator 106 and/or the actuator 112 may include a hydraulic cylinder, a pneumatic cylinder, or other suitable components configured to adjust the positions of the closing discs 100 and the closing device 102, respectively.

As illustrated, the shank row unit 36 includes the actuators 64, 84, 106, and 112. Any actuator of the actuators 64, 84, 106, and 112 may be a hydraulic cylinder, a pneumatic cylinder, a spring, or other suitable component for adjust a position and/or a pressure applied by a respective tool (e.g., the coulter assembly 40, the residue management system 42, the closing discs 100, the closing device 102, etc.) of the shank row unit 36. Additionally or alternatively, any tool may be omitted from the shank row unit 36 and/or the shank row unit 36 may include other tool(s).

As illustrated, the sensing assembly 48 includes a sensor 120 and a linkage assembly 122. The sensor 120 is coupled to the linkage assembly 122, and the linkage assembly 122 is coupled to the linkage assembly 110. In certain embodiments, the linkage assembly 122 may be coupled to the other portions of the shank row unit 36 (e.g., to the row unit frame 50, to the linkage assembly 104, etc.). In certain embodiments, the sensing assembly 48 may include other configurations. For example, the linkage assembly 122 may be omitted and/or the sensing assembly 48 may include other or alternative linkages to the coupled the sensor 120 to the shank row unit 36. The sensor 120 is configured to detect the volatile agricultural product generally above the soil surface 23 (e.g., above the trench 68). After the agricultural product application system 44 applies the volatile agricultural product within the trench 68 and/or the closing system 46 at least partially closes the trench 68, some of the volatile agricultural product may escape (e.g., as a gas or vapor) from the soil 22 and flow upwardly generally above the soil surface 23 (e.g., behind the closing system 46). The sensor 120 is configured to detect the presence of the volatile agricultural product above the soil surface 23 and/or the amount of the volatile agricultural product above the soil surface 23.

As illustrated, the sensing assembly 48 is disposed generally behind the closing system 46 along the longitudinal axis 27. In certain embodiments, the sensing assembly may be disposed elsewhere along the shank row unit 36 (e.g., generally between the agricultural product application system 44 and the closing system 46, or generally between the closing discs 100 and the closing device 102) and may detect the volatile agricultural product generally above the soil surface 23 (e.g., above the trench 68). For example, in embodiments with the sensing assembly disposed between the agricultural product application system 44 and the closing discs 100, the sensing assembly may detect the volatile agricultural product escaping the soil surface 23 at a high rate (e.g., the volatile agricultural product may be conditioned such that it escapes from the soil surface and dissipates quickly). As such, the location of the sensing assembly along the shank row unit 36 may affect the amount and/or concentration of the volatile agricultural product that the sensing assembly detects.

Based on the detected volatile agricultural product above the soil surface 23, the agricultural product control system may perform certain control operation(s) along the shank row unit 36. For example, if the sensing assembly 48 detects the presence of the volatile agricultural product above the soil surface 23, the agricultural product control system may adjust the depth/down pressure of the coulter assembly 40, the depth/down pressure of the residue management system 42, the depth 92 of the trench 68 (e.g., the depth of the agricultural product application system 44 at which the volatile agricultural product is applied), the position and/or the pressure applied to the closing system 46 (e.g., the closing discs 100 and/or the closing device 102), or a combination thereof. A controller of the agricultural product control system may instruct the actuator 84 to adjust the position of the shank assembly 80 to adjust the depth 92 of the trench 68. In certain embodiments, the controller of the agricultural product control system may instruct the actuator 84 to adjust the pressure applied by the shank assembly 80 to the soil to adjust the depth 92 of the trench 68 and/or the general depth at which the volatile agricultural product is applied. Increasing the pressure applied by the actuator 84 may cause the shank assembly 80 to penetrate farther into the soil 22 to enable deeper application of the volatile agricultural product by the agricultural product application system 44, and decreasing the pressure applied by the actuator 84 may cause the shank assembly 80 to penetrate less into the soil 22 to enable shallower application of the volatile agricultural product by the agricultural product application system 44 and to reduce drag on the agricultural implement from the shank row unit 36.

To adjust the pressure applied by the closing system 46 to the soil 22 (e.g., the pressure applied by the closing device 102), the controller of the agricultural product control system may instruct the actuator 112 to adjust the position of the closing device 102 and/or to adjust the down pressure applied by the closing device 102. Lowering the position of the closing device 102 may cause the closing device 102 to compact the soil 22 more to enable the soil 22 to retain more of the volatile agricultural product, and raising the position of the closing device 102 may cause the closing device 102 to compact the soil 22 less to reduce soil compaction. As such, the control operations that may be performed by the agricultural product control system at the shank row unit 36 may enhance efficiency of agricultural product application and/or control drag on the implement.

In some embodiments, tool(s) of the shank row unit 36 may be omitted and/or the shank row unit 36 may include other tool(s). For example, the coulter assembly 40, the residue management assembly 42, portion(s) of the closing system 36 (e.g., the closing discs 100 and/or the closing device 102), or a combination thereof may be omitted. Additionally, in some embodiments, certain actuator(s) of the actuators 64, 86, 106, and 112 may be omitted such that respective tool(s) are not controlled via the respective actuator(s).

Figure 4:
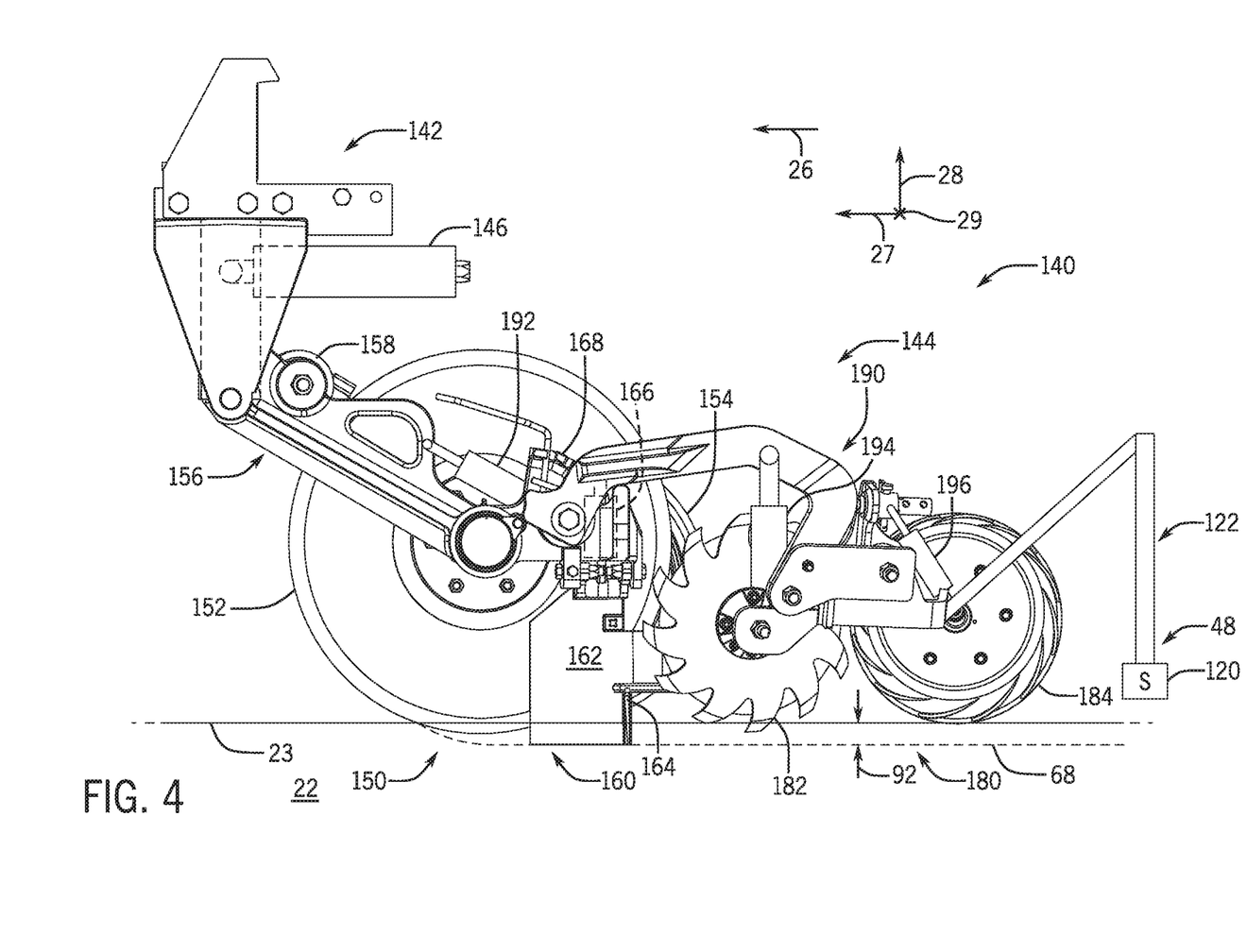
FIG. 4 is a side view of an embodiment of a knife row unit of the agricultural implement of FIG. 2, in accordance with an aspect of the present disclosure.

FIG. 4 is a side view of an embodiment of a knife row unit 140 that may be employed within the agricultural implement of FIG. 2. The knife row unit 140 may be positioned similarly to the row unit of the agricultural implement of FIG. 2. In addition, the knife row unit 140 may perform similar functions/operations as the row unit of the agricultural implement of FIG. 2 (e.g., form the trench, deposit the volatile agricultural product, at least partially close the trench, and detect the volatile agricultural product generally above the soil). As illustrated, the knife row unit 140 includes a row unit frame 142 configured to couple to the frame assembly of the agricultural implement. As illustrated, the knife row unit 140 also includes a linkage assembly 144 and an actuator 146. The linkage assembly 144 couples systems of the knife row unit 140 to the row unit frame 142, and the actuator 146 is configured to adjust a position of the linkage assembly 144 and/or a down pressure applied by the ground engaging tools coupled to the linkage 144. For example, the agricultural product control system may adjust the position of the linkage assembly 144, via the actuator 146, based on the detected volatile agricultural product generally above the soil surface 23.

As illustrated, the knife row unit 140 includes a coulter assembly 150, an agricultural product application system 160, a closing system 180, and the sensor assembly 48. The coulter assembly 150, the agricultural product application system 160, the closing system 180, and the sensor assembly 48 are coupled to the linkage assembly 144 that is coupled to the row unit frame 142. As described in greater detail below, the linkage assembly 144 includes certain other linkage assemblies of the coulter assembly 150, the agricultural product application system 160, the closing system 180, and the sensor assembly 48 that may move relative to one another. In certain embodiments, the coulter assembly 150, the agricultural product application system 160, the closing system 180, and the sensor assembly 48 may be directly coupled to the row unit frame 142 or to the frame assembly of the agricultural implement.

As illustrated, the coulter assembly 150 includes a coulter disc 152, a gauge wheel 154, a linkage assembly 156, and an actuator 158. The coulter disc 152 is configured to prepare the soil 22 for application of the volatile agricultural product. For example, the coulter disc 152 may roll along and penetrate the soil 22 to break up the soil 22 and/or to form a portion of the trench 68 within the soil 22. The gauge wheel 154 may roll along the surface of the soil 22 to control the penetrating depth of the coulter disc 152. The linkage assembly 156 is coupled to the row unit frame 142 and rotatably coupled to the coulter disc 152. The gauge wheel 154 is coupled to another linkage assembly of the knife row unit 140. The coulter disc 152 and the gauge wheel 154 may rotate independently of one another. The actuator 158 is coupled to the linkage assembly 156 and to the gauge wheel 154, via the other linkage assembly, and is configured to adjust a position of the other linkage assembly and of the gauge wheel 154 relative to the coulter disc 152 and the linkage assembly 156. For example, the actuator 158 may adjust a position of the other linkage assembly coupled to the gauge wheel 154 relative to the coulter disc 152 and the linkage assembly 156 and/or adjust a pressure applied by the gauge wheel 154. In certain embodiments, the actuator 158 may be coupled to a spring that urges the gauge wheel 154 toward the soil 22. As such, the actuator 158 may cause the gauge wheel 154 to remain in contact with the soil 22 as a level of the soil 22 varies.

As illustrated, the agricultural product application system 160 includes a knife 162, an applicator 164 disposed along and at least partially within the knife 162, an actuator 166, and a linkage assembly 168. The knife 162 is coupled to the actuator 166, the actuator 166 is coupled to the linkage assembly 168, and the linkage assembly 168 is coupled to the linkage assembly 156. The knife 162 is configured to form the trench 68 within the soil 22 (e.g., in combination with the coulter disc 152) as the knife row unit 140 travels across the soil 22. The knife 162 and the applicator 164 are adjustable generally vertically. For example, the actuator 166 may adjust the depth of the knife 162 and the applicator 164 within the soil 22 and/or the pressure applied by the knife 162 and the applicator 164 to the soil 22. Increasing the depth of the knife 162 may cause the knife 162 to penetrate farther into the soil 22 to enable deeper application of the agricultural product by the applicator 164, and decreasing the depth of the knife 162 may cause the knife 162 to penetrate less into the soil 22 to enable shallower application of the agricultural product by the applicator 164 and to reduce drag by the knife row unit 140 (e.g., which may reduce fuel usage by the work vehicle). As such, the actuator 166 may adjust the depth 92 at which the trench 68 is formed and the volatile agricultural product is applied. As illustrated, the actuator 166 includes a hydraulic cylinder. In certain embodiments, the depth actuator 166 may include a spring, a gear assembly, or another actuator configured to adjust the depth of the knife 162 and the applicator 164.

As illustrated, the closing system 180 includes a closing disc 182 and a closing device 184. The closing system 180 also includes a linkage assembly 190 and an actuator 192. The closing disc 182 and the closing device 184 are coupled to the linkage assembly 168 via the linkage assembly 190, and the linkage assembly 190 is configured to pivot relative to the linkage assembly 168. In certain embodiments, the linkage assembly 190 may be coupled to the linkage assembly 156, or directly to the row unit frame 142. The actuator 192 is coupled to the linkage assembly 190 and to the linkage assembly 156 and is configured to adjust a position and/or a down pressure of the closing system 180 (e.g., the closing disc 182 and the closing device 184) relative to the soil 22. In certain embodiments, the actuator 192 may be coupled to a spring that is coupled to the linkage assembly 190. The actuator 192 may adjust a pressure applied to the linkage assembly 190 by the spring to adjust a pressure that the closing disc 182 and/or the closing device 184 apply to the soil 22. As the knife row unit 140 travels along the soil 22, the closing disc 182 and the closing device 184 at least partially close the trench 68 to enhance application and/or retention of the volatile agricultural product within the soil 22.

As illustrated, the closing system 180 also includes an actuator 194 coupled to the closing disc 182 and to the linkage assembly 190, and an actuator 196 coupled to the closing device 184 and to the linkage assembly 190. The actuator 194 is configured to adjust a generally vertical position and/or angle of the closing disc 182 relative to the soil 22 to enable the closing disc 182 to move more or less of the soil 22 into the trench 68. As illustrated, the closing disc 182 is disposed generally perpendicular to the soil 22. However, in certain embodiments, the actuator 184 may adjust the angle of the closing disc 182 about the longitudinal axis 27 (e.g., the angle may be two degrees, five degrees, ten degrees, twenty degrees, etc.) relative to the soil 22. In some embodiments, the actuator 184 may adjust the angle of the closing disc 182 relative to the trench 68 (e.g., about the vertical axis 28). The actuator 196 may adjust a generally vertically position and/or down pressure of the closing device 184 to adjust the amount of pressure that the closing device 184 applies to the soil 22. In certain embodiments, the angle of the closing disc 182 and the closing device 184 may be adjusted relative to the trench 68 and/or relative to the vertical axis 28 by rotating/adjusting the linkage assembly 190.

The angle/position/down pressure of the closing disc 182 and the position/down pressure of the closing device 184 may be controlled based on the type of agricultural product that is subsequently planted in the soil, soil properties, and other factors related to the application of the volatile agricultural product. In some embodiments, the angle/position/down pressure may be adjusted based on the volatile agricultural product detected by the sensing assembly 48. For example, if the sensing assembly 48 detects the presence of the volatile agricultural product generally above the soil 22, the agricultural product control system may adjust the angle/position/down pressure of the closing disc 182 and/or the position/down pressure of the closing device 184 to improve closure of the trench 68. Further, in some embodiments, the knife row unit 140 may include multiple closing discs configured at least partially close the trench 68, and angles/positions/down pressures of the multiple closing discs may be independently adjusted based on the detected volatile agricultural product generally above the soil surface 23.

As illustrated, the sensing assembly 48 includes a sensor 120 and a linkage assembly 122. The sensor 120 is coupled to the linkage assembly 122, and the linkage assembly 122 is coupled to the linkage assembly 190. In certain embodiments, the linkage assembly 122 may be coupled to the other portions of the knife row unit 140 (e.g., to the row unit frame 142, to the linkage assembly 168, to the linkage assembly 156, etc.). In some embodiments, the sensing assembly 48 may include other configurations. For example, the linkage assembly 122 may be omitted and/or the sensing assembly 48 may include other or alternative linkages to the coupled the sensor 120 to the knife row unit 140. The sensor 120 is configured to detect the volatile agricultural product generally above the soil surface 23 (e.g., above the trench 68). After the agricultural product application system 160 applies the volatile agricultural product within the trench 68 and the closing system 180 at least partially closes the trench 68, some of the volatile agricultural product may escape from the soil 22 and be disposed generally above the soil surface 23 and behind the closing system 180. The sensor 120 is configured to detect the presence of the volatile agricultural product above the soil surface 23 and/or the amount of the volatile agricultural product above the soil surface 23.

As illustrated, the sensing assembly 48 is disposed generally behind the closing system 180 along the longitudinal axis 27. In certain embodiments, the sensing assembly 48 may be disposed elsewhere along the knife row unit 140 (e.g., generally between the agricultural product application system 160 and the closing system 180 or generally between the closing disc 182 and the closing device 184) and may detect the volatile agricultural product generally above the soil surface 23 (e.g., above the trench 68). For example, in embodiments with the sensing assembly disposed between the agricultural product application system 160 and the closing disc 182, the sensing assembly may detect the volatile agricultural product escaping the soil surface 23 at a high rate (e.g., the volatile agricultural product may be conditioned such that it escapes from the soil surface and dissipates quickly). As such, the location of the sensing assembly along the knife row unit 140 may affect the amount and/or concentration of the volatile agricultural product that the sensing assembly detects.

Based on the detected volatile agricultural product above the soil surface 23, the agricultural product control system may perform certain control operation(s) at the knife row unit 140. For example, if the sensing assembly 48 detects the presence of the volatile agricultural product above the soil surface 23, the agricultural product control system may adjust (e.g., increase or decrease) the depth of the agricultural product application system 160 (e.g., the depth of the knife assembly 162 via the actuator 166). Additionally or alternatively, if the sensing assembly 48 detects the presence of the volatile agricultural product above the soil surface 23, the agricultural product control system may adjust a position of the closing system 180 (e.g., the position and/or the angle of the closing disc 182 and/or the position of the closing device 184) relative to the soil 22 via the actuator 192. Increasing the pressure applied by the closing system 180 to the soil 22 may compact the soil 22 more to enable the soil 22 to retain more of the volatile agricultural product. Decreasing the pressure applied by the closing system 180 to the soil 22 may compact the soil 22 less to reduce soil compaction and/or to reduce drag by the knife row unit 140. As such, the control operations that may be performed by the agricultural product control system at the knife row unit 140 may enhance efficiency of agricultural product application.

In certain embodiments, portion(s) of the knife row unit 140 may be disposed on opposite sides along the lateral axis 29 compared to the illustrated embodiment. For example, the coulter assembly 150 and the closing assembly 180 may be disposed on an opposite lateral side of the knife row unit 140, and/or the agricultural product application system 160 may be disposed on an opposite side of the coulter assembly 150. As such, the locations of the various components of the knife row unit 140 may vary along the lateral axis 29. In certain embodiments, tool(s) of the knife row unit 140 (e.g., the coulter disc 152, the gauge wheel 154, the closing disc 182, the closing device 184, or a combination thereof), may be omitted and/or the knife row unit 140 may include other tool(s). Additionally, in some embodiments, certain actuator(s) of the actuators 146, 158, 166, 192, 194, and 196 may be omitted such that respective tool(s) are not controlled via the respective actuator(s).

Figure 5:
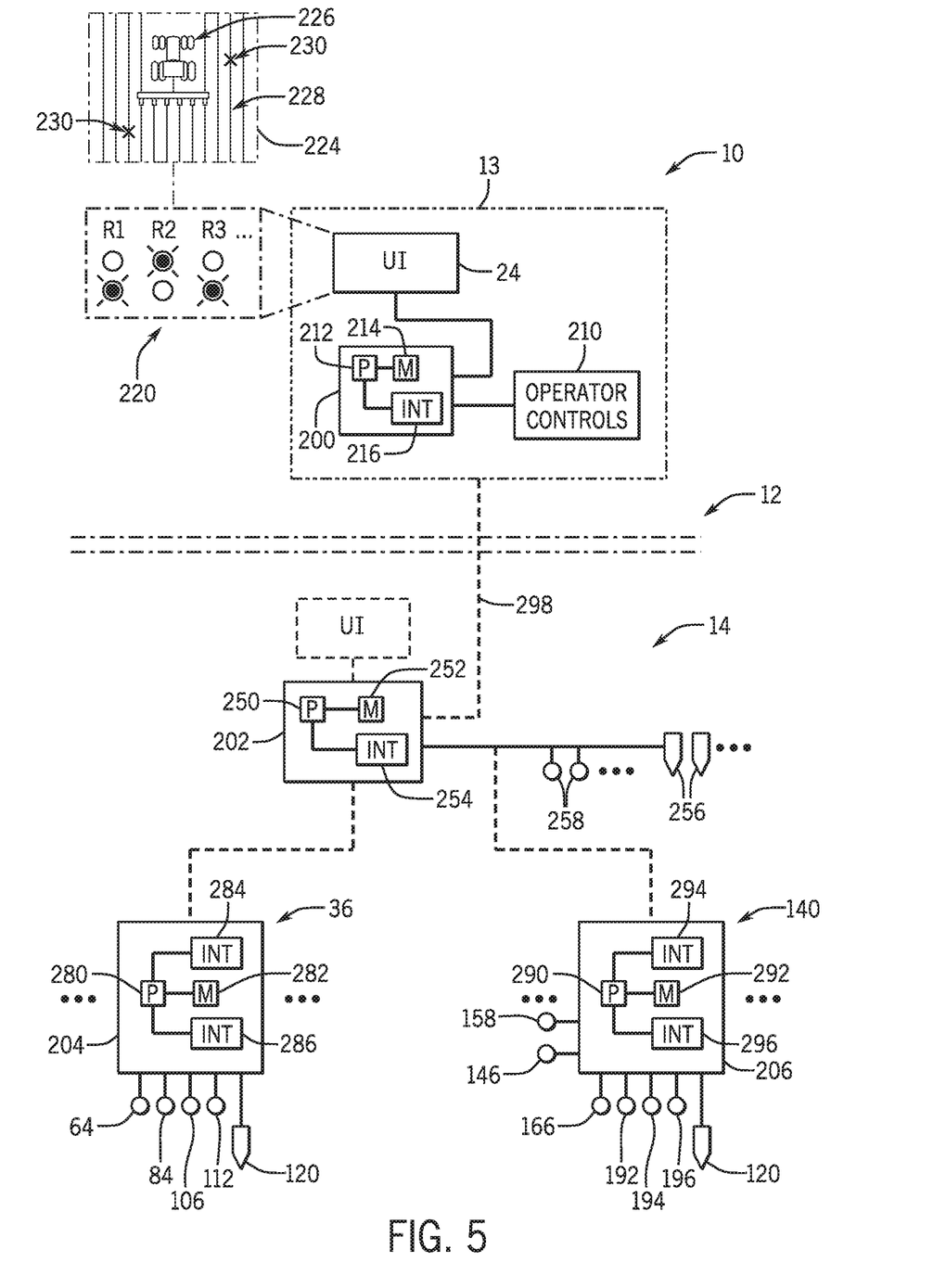
FIG. 5 is a schematic view of an embodiment of the agricultural product control system of the agricultural system of FIG. 1, in accordance with an aspect of the present disclosure.

FIG. 5 is a schematic view of an embodiment of the agricultural product control system 12 of the agricultural system 10 of FIG. 1. As illustrated, the agricultural product control system 12 includes a work vehicle controller 200 of the work vehicle 13, an agricultural implement controller 202 of the agricultural implement 14, a row unit controller 204 of the shank row unit 36, and a row unit controller 206 of the knife row unit 140. In certain embodiments, the agricultural implement 14 may include only the shank row unit 36 (e.g., multiple shank row units 36 disposed along the agricultural implement 14), only the knife row unit 140 (e.g., multiple knife row units 140 disposed along the agricultural implement 14), or a combination of the shank row units 36 and the knife row units 140. The agricultural product control system 12 may control portions of the agricultural system 10 via the work vehicle controller 200, the agricultural implement controller 202, the row unit controller 204, the row unit controller 206, or a combination thereof. Additionally, in some embodiments, some of all of the shank row units 36 of the agricultural implement 14 may include the row unit controller 204, and/or some or all of the knife row units 140 of the agricultural implement 14 may include the row unit controller 206. Further, in certain embodiments, the work vehicle controller 200, the agricultural implement controller 202, the row unit controller 204, the row unit controller 206, or a combination thereof may be omitted from the agricultural product control system 12 (e.g., the remaining controller may perform control functions of the agricultural system 10 and/or the agricultural product control system 12).

As described above, the agricultural product control system 12, via the sensor 120, is configured to detect the presence and/or the amount of the volatile agricultural product generally above the soil surface. Additionally, the agricultural product control system 12, via a controller (e.g., the work vehicle controller 200, the agricultural implement controller 202, the row unit controller 204, the row unit controller 206, or a combination thereof) may compare the amount of the volatile agricultural product generally above the soil surface to a threshold value. If the amount is greater than the threshold value, the agricultural product control system 12 may perform the certain control operations at the row units. Additionally or alternatively, the agricultural product control system 12 may perform certain control operations at the row units based on the detected presence of the volatile agricultural product above the soil surface.

For example, at the shank row unit 36, based on the presence of the volatile agricultural product generally above the soil surface and/or based on the detected amount of the volatile agricultural product exceeding the threshold value, the row unit controller 204 may output a control signal to the actuator 64 indicative of instructions to adjust the position of the coulter disc, output a control signal to the actuator 84 indicative of instructions to adjust the position/angle/down pressure of the agricultural product application system, output a control signal to the actuator 106 indicative of instructions to adjust the position/angle of the closing discs, output a control signal to the actuator 112 to cause the actuator 112 to adjust the position/down pressure of the closing device, or a combination thereof. By way of another example, at the knife row unit 140, based on the presence of the volatile agricultural product generally above the soil surface and/or based on the detected amount of the volatile agricultural product exceeding the threshold value, the row unit controller 206 may output a control signal to the actuator 146 indicative of instructions to adjust the position of the linkage assembly and positions of various tools of the knife row unit 140, output a control signal to the actuator 158 indicative of instructions to adjust the position/down pressure of the coulter disc and gauge wheel, output a control signal to the actuator 166 indicative of instructions to adjust the position/down pressure of the agricultural product application system, output a control signal to the actuator 192 indicative of instructions to adjust the position/down pressure applied to the closing system, output a control signal to the actuator 194 indicative of instructions to adjust the position/angle/down pressure of the closing disc, output a control signal to the actuator 196 indicative of instructions to adjust the position/down pressure of the closing device, or a combination thereof.

The threshold value may be a percentage of an amount of the volatile agricultural product output by the agricultural product application system (e.g., an amount per linear distance and/or an amount per time). Further, the threshold value may depend on certain factors, such as the type of volatile agricultural product, properties of the soil, user preferences, a rate of application of the volatile agricultural product, and other factors that may affect the application of the volatile agricultural product. Moreover, the agricultural product control system 12 may distinguish between momentary detection of the volatile agricultural product generally above the soil surface (e.g., momentary escapes of the volatile agricultural product from the soil) and extended detection for a time period (e.g., three to five seconds, five to ten seconds, ten to twenty seconds, etc.) of the volatile agricultural product generally above the soil surface (e.g., extended escapes of the volatile agricultural product from the soil). For example, the agricultural product control system 12, via the controller, may monitor the sensor signals received from the sensor(s) 120 and determine when a sustained escape has occurred from the soil. The controller may determine that the sustained escape has occurred when the volatile agricultural product detected by the sensor 120 is greater than the threshold value for more than the threshold duration. Based on the sustained escape, the controller may perform any of the control operations discussed above.

Turning to the specific components of the agricultural product control system 12, as illustrated, the user interface 24, the work vehicle controller 200, and operator controls 210 are disposed generally in the work vehicle 13. In certain embodiments, the user interface 24, the work vehicle controller 200, the operator controls 210, or a combination thereof may be disposed remotely from the work vehicle 13. The work vehicle controller 200 may control certain operations of the work vehicle 13 and/or the agricultural product control system 12.

As illustrated, the work vehicle controller 200 includes a processor 212, a memory 214, and an interface 216. The work vehicle controller 200 is configured to control certain parameter(s) associated with the operation of the agricultural product control system 12 and/or the work vehicle 13. For example, the work vehicle controller 200 may receive signal(s) from the agricultural implement controller 202, the row unit controller 204, the row unit controller 206, or a combination thereof, indicative of the presence and/or the amount of the volatile agricultural product generally above the soil surface. The controller 200 may also receive other parameters associated with the operation of the work vehicle 13 and/or the agricultural implement 14. Such signal(s) may be received at the processor 212 via the interface 216. In certain embodiments, the work vehicle controller 200 may receive signal(s) directly from the sensors 120, output signal(s) directly to the actuators 64, 84, 106, 112, 146, 166, 192, 194, 196, or a combination thereof. The parameters indicated by the signal(s) and received by the work vehicle controller 200 may be stored in the memory 214.

In the illustrated embodiment, the work vehicle controller 200 is communicatively coupled to the user interface 24 and operator controls 210. The operator disposed in the cab of the work vehicle 13 or disposed remotely may interact with the user interface 24 to control the agricultural product control system 12, the work vehicle 13, the agricultural implement 14, or a combination thereof. For example, the user interface 24 may display certain parameters received by the agricultural product control system 12 and/or certain determinations made by the agricultural product control system 12. Additionally, the user interface 24 may communicate to the user (e.g., the operator) of the agricultural system 10 certain performance monitoring characteristics (e.g., the presence and/or amount of the volatile agricultural product generally above the soil surface). For example, as illustrated, the user interface 24 includes visual indicators 220 that may be visible to the user. The visual indicators 220 show whether the volatile agricultural product is detected at particular rows for individual shank row units 36 and knife row units 140. Each row formed by a respective row unit in the field corresponds to a set of two visual indicators (e.g., R1, R2, R3, etc.). A first visual indicator 220 of a set of two indicates whether the volatile agricultural product is detected above the soil surface at the respective row, and a second visual indicator 220 of the set of two indicates whether the volatile agricultural product is detected above the soil surface at the respective row.

Additionally, as illustrated, a variation of the user interface 24 includes an as-applied map 224 drawn in real-time or near real-time that indicates a position 226 of the agricultural system 10, positions 228 of the rows formed by the row units, and positions 230 at which the volatile agricultural product is detected generally above the soil surface. In certain embodiments, the user interface 24 may include other user-detectable indicators, in addition to or instead of the visual indicators 220 and the as-applied map 224, indicative of whether the volatile agricultural product is detected above the soil surface at each respective row. Further, the user interface 220 may include certain alerts (i.e., a pop-up window) that indicate detection of the volatile agricultural product at certain row(s). In certain embodiments, the user interface 24 may provide an indication of the amount of volatile agricultural product detected by the sensor(s) 120 at individual row unit(s) or section(s) of row units. Records of the various user detectable indicators (e.g., the visual indicators 220, the as-applied map 224, and the amounts of the detected volatile agricultural product above the soil surface) may be saved in the memory 214 of the controller 200 to enable the user to maintain records of the application of the volatile agricultural product. The records may enable the user to demonstrate compliance with certain environmental regulations, determine amounts of the volatile agricultural product applied in certain locations of a field, and perform other tasks associated with the application of the volatile agricultural product.

The operator controls 210 may include certain mechanisms that enable the operator to adjust parameter(s) of the agricultural implement 14 and individual row units. For example, after viewing the visual indicators 220, the as-applied map 224, and/or the other user-detectable indicators, the operator may make an adjustment to an individual shank row unit 36 or an individual knife row unit 140 based on the user-detectable indicators. Such an adjustment may include adjustment(s) to position(s) of portions of the shank row units 36 and the knife row units 140. In certain embodiments, the work vehicle controller 200 may output signal(s) indicative of such adjustments based on the operator inputs received at the operator controls 210. In some embodiments, the operator controls 210 may be included within the user interface 24. Additionally, in certain embodiments, the work vehicle controller 200 may include the operator controls 210.

The agricultural implement 14 includes the agricultural implement controller 202. The agricultural implement controller 202 may control certain operations of the agricultural product control system 12 and/or the agricultural implement 14. As illustrated, the agricultural implement controller 202 includes a processor 250, a memory 252, and an interface 254. The agricultural implement controller 202 is configured to control operation(s) and/or determine parameter(s) of the agricultural implement 14. For example, the agricultural implement controller 202 may receive signals from the sensor(s) 120 and from implement sensors 256 at the processor 250 and via the interface 254. The implement sensors 256 may include sensors that detect various parameters associated with operation of the agricultural implement 14. For example, the implement sensors 256 may detect the volatile agricultural product generally above the soil surface, a tire pressure, a pressure applied to a component of a row unit, and other parameters associated with the operation of the agricultural implement 14. Such measured parameters may be stored in the memory 252.

The agricultural implement controller 202 may also output signals to implement actuators 258 via the processor 250 and the interface 254. The implement actuators 258 may include actuators that modify aspects of certain components of the agricultural implement 14. For example, the implement actuators 258 may adjust a position of the agricultural product application system or the closing system, adjust a position of the closing discs, adjust a tire pressure, and adjust other parameters associated with the operation of the agricultural implement 14. In certain embodiments, the processor 250 may execute instructions stored in the memory 252 to output signal(s) to the implement actuators 258 to cause the implement actuators 258 to change the aspects of the certain components of the agricultural implement 14. The signal(s) output to the implement actuators 258 may be in response to the signal(s) received from the implement sensors 256.

As described herein, the controller (e.g., the work vehicle controller 200, the agricultural implement controller 202, the row unit controller 204, the row unit controller 206, or a combination thereof) may output signals to certain actuators indicative of instructions to adjust a position, angle, down pressure, or a combination thereof, of tool(s) coupled to the respective actuators. In certain embodiments, such signals may be sent to valve assemblies coupled to the respective actuators. Based on the signals, the valve assemblies may perform the adjustments to the respective actuators. For example, the valve assemblies may be coupled to pneumatic actuators and/or hydraulic actuators and may perform the adjustments at the pneumatic actuators and/or at the hydraulic actuators. In some embodiments, an actuator may be an electronic actuator that directly receives the signal from the controller and performs the corresponding adjustment to the position, the angle, the down pressure, or the combination thereof.

As illustrated, the agricultural product control system 12 includes the row unit controller 204 at the shank row unit 36 and the row unit controller 206 at the knife row unit 140. The agricultural implement 14 may include a respective row unit controller 204 at some or all of the shank row units 36 and may include a respective row unit controller 206 at some or all of the row units 140. The row unit controller 204 includes a processor 280, a memory 282, a first interface 284, and a second interface 286. The row unit controller 204 is configured to control operation(s) and/or determine parameter (s) of the shank row unit 36. For example, as illustrated, the row unit controller 204 is communicatively coupled to the sensor 120 and the actuators 64, 84, 106, and 112. As described herein, the sensor 120 is configured to output a signal indicative of the presence and/or the amount of the volatile agricultural product generally above the soil surface. The sensor 120 may output the signal to the row unit controller 204. The signal output by the sensor 120 may be received by the processor 280 via the second interface 286. In response, the processor 280 may output signal(s) to the work vehicle controller 200 and/or the agricultural implement controller 202 via the first interface 284. In certain embodiments, the measurements detected by the sensor 120 may be stored in the memory 282 of the row unit controller 204.

In certain embodiments, the agricultural product control system 12 may control aspects of the work vehicle (e.g., via ISObus communication between the agricultural implement 14 and the work vehicle) based on the sensed presence and/or the amount of the volatile agricultural product generally above the soil surface to improve retention of the volatile agricultural product within the soil. For example, a forward travel speed of the work vehicle may affect retention of the agricultural product within the soil. The agricultural product control system 12 may adjust the forward travel speed of the work vehicle based on the sensed presence and/or the amount of the volatile agricultural product generally above the soil surface. The forward travel speed of the work vehicle and the agricultural implement 12 including the shank row unit 36 may range from four miles per hour (mph) to seven mph. The forward travel speed of the work vehicle and the agricultural implement 12 including the knife row unit 140 may range from six mph to nine mph.

The row unit controller 206 includes a processor 290, a memory 292, a first interface 294, and a second interface 296. The row unit controller 206 is configured to control operation(s) and/or determine parameter(s) of the knife row unit 140. For example, as illustrated, the row unit controller 206 is communicatively coupled to the sensor 120 and the actuators 146, 158, 166, 192, 194, and 196. As described herein, the sensor 120 is configured to output a signal indicative of the presence and/or the amount of the volatile agricultural product generally above the soil surface. The sensor 120 may output the signal to the row unit controller 206. The signal output by the sensor 120 may be received by the processor 290 via the second interface 296. In response, the processor 290 may output signal(s) to the work vehicle controller 200 and/or the agricultural implement controller 202 via the first interface 294. In certain embodiments, the measurements detected by the sensor 120 may be stored in the memory 292 of the row unit controller 204.

As illustrated, the user interface 24, the work vehicle controller 200, the agricultural implement controller 202, the row unit controller 204, and the row unit controller 206 are connected via a network 298. The network 298 may include a wired connection (e.g., Ethernet, universal serial bus (USB), CANbus, ISObus, etc.) and/or a wireless connection (e.g., Wi-Fi, Bluetooth, etc.) between the user interface 24, the work vehicle controller 200, the agricultural implement controller 202, the row unit controller 204, the row unit controller 206, other components of the agricultural product control system 12, or a combination thereof. As such, the network 298 enables the user interface 24, the work vehicle controller 200, the agricultural implement controller 202, the row unit controller 204, the row unit controller 206, the other components of the agricultural product control system 12, or the combination thereof, to communicate via wired and/or wireless signal(s).

As described above, the agricultural product control system 12 includes a memory (e.g., the memory 214, the memory 252, the memory 282, the memory 292) and a processor (e.g., the processor 212, the processor 250, the processor 280, the processor 290). In some embodiments, each memory may include one or more tangible, non-transitory, computer-readable media that store instructions executable by the corresponding processor and/or data to be processed by the corresponding processor. For example, the memory 214 may store instructions executable by the processor 212, and the processor 212 may be configured to execute the instructions stored by the memory 214. Each memory may include random access memory (RAM), read-only memory (ROM), rewritable non-volatile memory (e.g., flash memory), hard drive(s), optical disc(s), or a combination thereof. As such, each memory of the agricultural product control system 12 may include certain instructions (e.g., software) for controlling certain operations of the agricultural product control system 12. The processors may include general-purpose microprocessors, one or more application specific integrated circuits (ASICs), one or more field programmable logic arrays (FPGAs), or a combination thereof.

Figure 6:
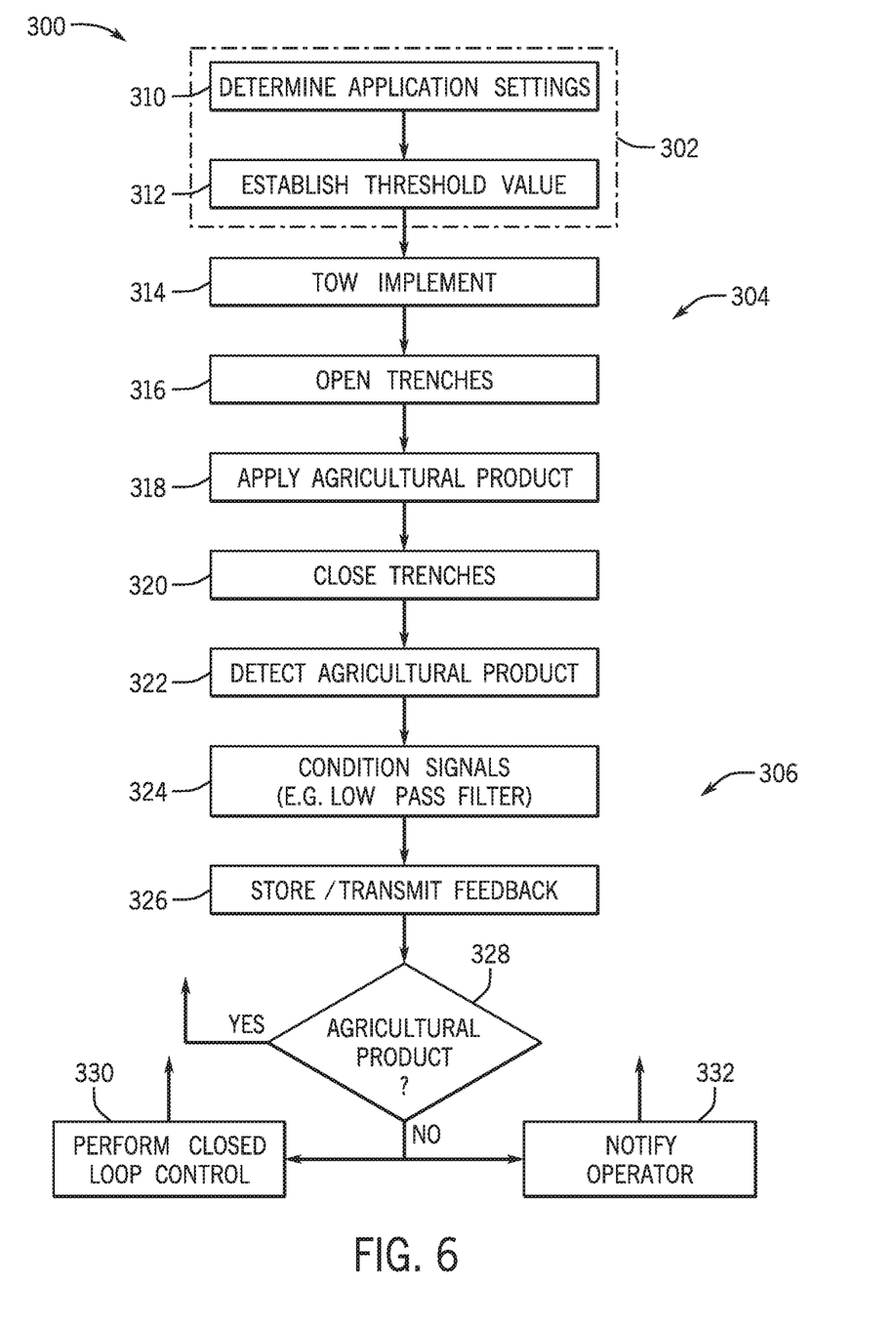
FIG. 6 is a flowchart of an embodiment of a method for controlling agricultural product flow, in accordance with an aspect of the present disclosure.

FIG. 6 is a flowchart of an embodiment of a method 300 for controlling agricultural product flow. As illustrated, the method 300 includes a setup phase 302, an operational phase 304, and a sensing and control phase 306. In certain embodiments, the method 300 may include more or fewer phases to control agricultural product flow. The setup phase 302 includes blocks 310 and 312. At block 310, application settings for the volatile agricultural product are determined/ established. For example, the application settings may include the type of volatile agricultural product, the position of the sensing assembly along the row unit (e.g., directly after the agricultural product application system or after the closing system(s)), soil properties, application rate (e.g., an amount of the volatile agricultural product applied per acre of land), and other factors. The controller may determine the application settings based on inputs to the user interface and/or based on historical data, for example. At block 312, the threshold value is established. The threshold value may be provided/selected by the operator and/or may be automatically determined by the controller. For example, the threshold value may be a percentage of the amount output by row unit. In certain embodiments, the threshold value may include range(s) relative to the application settings and may be used by the controller to perform certain control operations. The threshold value is compared by the controller to measured values detected by the sensor(s) to determine whether certain control operations may be performed by the agricultural product control system and/or whether certain measurements/alerts may be reported to the operator by the agricultural product control system. By way of specific example, the threshold value may be one percent of the amount of volatile agricultural product that is output. If the detected amount of the volatile agricultural product is greater than one percent of the output, the agricultural product control system may perform certain control operation(s) (e.g., adjusting the depth of the agricultural product application system) to decrease the amount of the volatile agricultural product escaping from the soil and/or may alert the operator of the detected amount being greater than the threshold value.

The operational phase 304 includes blocks 314, 316, 318, and 320. At block 314, the work vehicle tows the agricultural implement through the field. In certain embodiments, the agricultural implement may be self-propelled. As the agricultural implement travels through the field, the row units of the agricultural implement engage the soil of the field. For example, at block 316, the coulter assemblies and/or the agricultural product application systems of the row units engage the soil to open the trenches in the soil. At block 318, the agricultural product application systems apply the volatile agricultural product within the trenches. At block 140, the closing systems of the row units push the soil into the trenches to at least partially close the trenches and to compact the soil.

The control and monitoring phase 306 includes blocks 322, 324, 326, 328, 330, and 332. At block 322, the agricultural product control system detects the presence and/or the amount of the volatile agricultural product. For example, the agricultural product control system may detect the presence and/or the amount of the volatile agricultural product via the sensor(s). The sensor(s) may output signal(s) to the controller (e.g., the work vehicle controller, the agricultural implement controller, and/or the row unit controller) of the agricultural product control system indicative of the presence and/or the amount of the volatile agricultural product. At block 324, the signal(s) output by the sensor(s) are conditioned. For example, a low pass filter may condition the signal(s) for receipt by the controller of the agricultural product control system. At block 326, the signal(s) are received at the controller and the value(s) indicated by the signal(s) are stored the memory of the controller. The value(s) are also transmitted to the processor of the controller.

At block 328, the controller determines whether the volatile agricultural product is present generally above the soil surface or whether the amount of the volatile agricultural product above the soil surface exceeds the threshold value. For example, the controller may compare the value indicative of the amount of the volatile agricultural product, as received from the sensor, to the threshold value previously established in the setup phase 302. If the controller determines that the amount of the volatile agricultural product generally above the soil surface is acceptable (e.g., the amount is less than the threshold value), the method 300 returns to a previous block (i.e., to one of the blocks 310-322). If the controller determines that the amount of the volatile agricultural product generally above the soil is unacceptable (e.g., the amount is greater than the threshold value), the method 300 proceeds to blocks 330 and 332.

At block 330, the controller performs closed loop control of certain components of the respective row unit(s). For example, the controller may output signal(s) to actuator(s) of the respective row unit(s) to instruct the actuator(s) to adjust respective component(s) of the row unit(s) to cause the soil to retain the volatile agricultural product. At block 332, in addition to or independent of block 330, the agricultural product control system notifies the operator of the detected amount of the volatile agricultural product (e.g., the amount being greater than the threshold value). For example, the controller may output signal(s) to the user interface to provide user-detectable alert(s) for viewing by the operator. After completing the blocks 330 and/or 332, the method 300 may return to a previous block (i.e., to one of the blocks 310-322).

In certain embodiments, the agricultural product control system described herein may enable the work vehicle, the agricultural implement, the row unit, or a combination thereof, to improve application and retention of volatile agricultural product within soil. For example, after application of the volatile agricultural product within the soil, the agricultural product control system may determine whether the volatile agricultural product is generally present above the soil surface and/or may determine an amount of the volatile agricultural product that is present above the soil surface. In response to the determination, the agricultural product control system may perform a closed loop control operation at a row unit to improve the retention of the volatile agricultural product within the soil. As described herein, the ability of the soil to retain more of the volatile agricultural product may improve crop yields, decrease costs associated with application of the volatile agricultural product (e.g., use less volatile agricultural product), and improve environmental conditions.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural product control system for an agricultural implement, comprising:
an actuator configured to control a penetration depth of an agricultural product application system within soil;
a sensor positioned above a surface of the soil and configured to output a sensor signal indicative of agricultural product above the surface of the soil; and
a controller comprising a memory and a processor, wherein the controller is configured to:
receive the sensor signal indicative of the agricultural product above the surface of the soil; and
output a control signal to the actuator indicative of instructions to adjust the penetration depth of the agricultural product application system based on the sensor signal indicative of the agricultural product above the surface of the soil.

2. The agricultural product control system of claim 1, wherein the controller is configured to determine whether an amount of the agricultural product above the surface of the soil is greater than a threshold value based on the sensor signal, and to only output the control signal indicative of the instructions to adjust the penetration depth of the agricultural product application system in response to determining that the amount of the agricultural product above the surface of the soil is greater than the threshold value.

3. The agricultural product control system of claim 2, wherein the threshold value is determined based on field conditions, a type of crop to be subsequently planted, a type of the agricultural product, an amount of the agricultural product output by the agricultural product application system, or a combination thereof.

4. The agricultural product control system of claim 2, wherein the controller is configured to only output the control signal indicative of the instructions to adjust the penetration depth of the agricultural product application system in response to determining that the amount of the agricultural product above the surface of the soil is greater than the threshold value for a threshold duration.

5. The agricultural product control system of claim 4, wherein the threshold duration is at least three seconds.

6. The agricultural product control system of claim 1, wherein the controller is configured to determine a map indicative of the agricultural product above the surface of the soil.

7. The agricultural product control system of claim 6, comprising a user interface communicatively coupled to the controller and configured to display the map indicative of the agricultural product above the surface of the soil.

8. The agricultural product control system of claim 1, wherein the agricultural product comprises a fertilizer, a fungicide, a insecticide, or a root stimulator.

9. The agricultural product control system of claim 8, wherein the fertilizer comprises anhydrous ammonia.

10. An agricultural implement, comprising:
a row unit comprising an agricultural product application system configured to apply an agricultural product within a trench in soil, and a closing system configured to at least partially close the trench;
a first actuator configured to control a position of the agricultural product application system to control a depth of the trench, a second actuator configured to control a down pressure applied by the closing system, a third actuator configured to control an angle of the closing system relative to the trench, or a combination thereof; and
an agricultural product control system comprising:
a sensor positioned above a surface of the soil and configured to output a sensor signal indicative of agricultural product above the surface of the soil; and
a controller comprising a memory and a processor, wherein the controller is configured to:
receive the sensor signal indicative of the agricultural product above the surface of the soil; and
output a first control signal to the first actuator indicative of instructions to adjust the penetration depth of the agricultural product application system based on the sensor signal indicative of the agricultural product above the surface of the soil, output a second control signal to the second actuator indicative of instructions to adjust the down pressure applied by the closing system based on the sensor signal indicative of the agricultural product above the surface of the soil, output a third control signal to the third actuator indicative of instructions to adjust the angle of the closing system relative to the trench based on the sensor signal indicative of the agricultural product above the surface of the soil, or a combination thereof.

11. The agricultural implement of claim 10, wherein the controller is configured to determine whether an amount of the agricultural product above the soil is greater than a threshold value based on the sensor signal, and to only output the first control signal, the second control signal, the third control signal, or the combination thereof, in response to determining that the amount of the agricultural product above the surface of the soil is greater than the threshold value.

12. The agricultural implement of claim 10, wherein the agricultural product application system comprises an applicator configured to flow the agricultural product into the trench, and the first control signal causes the first actuator to move the applicator generally vertically.

13. The agricultural implement of claim 12, wherein the agricultural product application system comprises a shank assembly, and the applicator is disposed within the shank assembly.

14. The agricultural implement of claim 12, wherein the agricultural product application system comprises a knife configured to at least partially form the trench, and the applicator is disposed within the knife.

15. The agricultural implement of claim 10, wherein the controller is configured to output a fourth control signal to a work vehicle towing the agricultural implement, to the agricultural implement, or both, indicative of an adjustment of a travel speed of the work vehicle, the agricultural implement, or both.

16. A non-transitory computer readable medium comprising executable instructions that, when executed by a processor, cause the processor to:
- receive a sensor signal indicative of an agricultural product above a surface of soil; and
- output a first control signal to a first actuator indicative of instructions to adjust a penetration depth of an agricultural product application system based on the sensor signal indicative of the agricultural product above the surface of the soil, output a second control signal to a second actuator indicative of instructions to adjust a down pressure applied by a closing system based on the sensor signal indicative of the agricultural product above the surface of the soil, output a third control signal to a third actuator indicative of instructions to adjust an angle of the closing system relative to a trench based on the sensor signal indicative of the agricultural product above the surface of the soil, or a combination thereof.

17. The non-transitory computer readable medium of claim 16, comprising executable instructions that, when executed by a processor, cause the processor to:
- determine whether an amount of the agricultural product above the surface of the soil is greater than a threshold value based on the sensor signal, and to only output the first control signal, the second control signal, the third control signal, or the combination thereof, in response to determining that the amount of the agricultural product above the surface of the soil is greater than the threshold value.

18. The non-transitory computer readable medium of claim 17, wherein the processor only outputs the first control signal, the second control signal, the third control signal, or the combination thereof, in response to determining that the amount of the agricultural product above the surface of the soil is greater than the threshold value for a threshold duration.

19. The non-transitory computer readable medium of claim 17, comprising executable instructions that, when executed by a processor, cause the processor to:
- determine the threshold value based on field conditions, a type of crop to be subsequently planted, a type of the agricultural product, an amount of the agricultural product output by the agricultural product application system, or a combination thereof.

20. The non-transitory computer readable medium of claim 16, comprising executable instructions that, when executed by a processor, cause the processor to:
- determine the down pressure to be applied to the closing system based on an amount of the agricultural product above the surface of the soil.

* * * * *